Patented Oct. 17, 1950

2,526,106

UNITED STATES PATENT OFFICE 2,526,106

COMPOSITION COMPRISING A NITROGENOUS RESIN AND COPPER FOR AFTER-TREATING SUBSTANTIVE DYEINGS AND PRINTS

Otto Albrecht, Neuewelt, Jost Frei, Monthey, and Albert Landolt, Riehen, Switzerland, assignors to Ciba Limited, a Swiss firm No Drawing. Application June 19, 1946, Serial No. 677,921. In Switzerland June 29, 1945

9 Claims. (Cl. 8—74)

The present invention relates to compositions of matter containing, on the one hand, complex water-soluble copper compounds or components capable of forming such compounds and, on the other hand, basic condensation products of formaldehyde with compounds containing at least once the atomic grouping

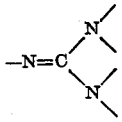

or easily forming such compounds under the conditions of the condensation, and which may also contain alkali carbonates, which compositions of matter are very suitable for the after-treatment of dyeings or prints made with water-soluble substantive dyestuffs. Through the after-treatment with these compositions of matter the fastness to washing of such dyeings or prints is enhanced and in many cases the light fastness of the thus after-treated dyeings or prints is affected less than through the use of the aforementioned formaldehyde condensation products alone.

As complex copper compounds the compositions of matter comprised by the present invention may contain complex copper salts which contain, for instance, ammonia or amines, such as trimethylamine, triethanolamine, ethylenediamine, pyridine, or 8-aminoquinoline, for instance complex formates, acetates, sulfates, chlorides or nitrates. Of these, mention may be made of tetrammine-copper-II-acetate, tetrammine-copper-II-sulfate, tetrammine-copper-II-sulfamate, tetrammine-copper-II-nitrate, diethylenediamine-copper-II-acetate, also the complex compound of copper-II-acetate and triethanolamine. Furthermore, there may be used complex copper compounds of hydroxy carboxylic acids, such as glycolic acid, lactic acid or tartaric acid, for example, copper-sodium-tartrate (the solution of which is known as Fehling's solution).

The new compositions of matter may contain as components forming complex copper compounds, for instance, mixtures of copper salts, ammonium salts, such as ammonium chloride or ammonium sulfate, and alkali carbonates. When such mixtures are dissolved in water, the corresponding complex tetrammine-copper salts are formed.

The above named complex copper compounds and the components mentioned which form such compounds may be defined as ingredients forming on addition of water a water-soluble complex copper compound.

For the purposes of the present invention, there may be used as compounds containing at least once the atomic grouping

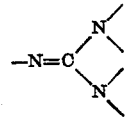

for example, dicyandiamide, dicyandiamidine, guanidine, acetoguanidine, biguanide or melamine. Mention may be made of cyanamide as a compound easily forming a compound which contains at least once the atomic grouping

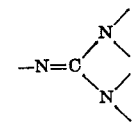

As condensation products of these compounds with formaldehyde there are especially suitable for the purposes of the instant invention those made with more than 1 mol, for instance 2–4 or more mols of formaldehyde per mol of the compound which contains at least once the atomic grouping

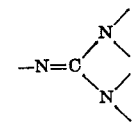

or which can easily be converted into such compound.

With the new compositions of matter there may be after-treated dyeings and prints made with any water-soluble substantive dyestuff which is soluble in water or the customary dye-baths, if desired in slightly alkaline (for instance, alkaline with sodium carbonate) dye-baths, for example dyeings and prints made with substantive dyestuffs which contain metals in complex union. Especially advantageous is the after-treatment of dyeings and prints made with water-soluble substantive dyestuffs whose molecule contains at least once the atomic grouping

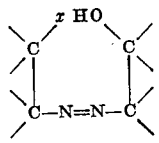

wherein the pair of carbon atoms carrying $x$ may belong to an aromatic nucleus of the benzene or naphthalene series and that pair of carbon atoms carrying the OH group may belong to any coupling component and wherein $x$ is a OH-group or a COOH-group. Dyestuffs of this type have hitherto been used mainly in the form of their complex copper compounds in direct dyeing or as after-coppering dyestuffs, the after-treatment with copper-yielding agents in the latter case being carried out either in a second bath, for instance in slightly acid solution, or in the alkaline dyebath itself. The advantage of the new process over the known methods lies in the usually much greater wet fastness of the dyeings obtained.

The molecule of substantive dyestuffs used may, if desired, contain in addition to the atom grouping of the above indicated constitution other metal complex forming atom groupings, such as, for instance, the salicyclic acid grouping.

The dyeings and prints whose fastness properties are to be improved by the new compositions of matter may be made on any material, for instance, animal fibers and especially on cellulosic fiber material, like wool, silk, particularly cotton, linen, rayon and staple fibres of regenerated cellulose, and other material.

An advantage of the after-treatment with liquors containing the new compositions of matter over that in baths of corresponding composition, but with non-complex copper salts instead of complex copper salts is that the after-treating baths are more stable. It must be remembered in this connection that aqueous solutions containing both non-complex copper salts and formaldehyde condensation products of the indicated kind have a tendency to form water-insoluble precipitations, when allowed to stand.

Moreover, the present invention permits of the use of copper salt solutions with an alkaline reaction which is not possible when non-complex copper salts are employed. The use of after-treating baths with copper complex salts showing an alkaline reaction, for instance baths containing sodium carbonate, is desirable because any changes in shade that may occur when laundering dyed or printed materials which have been after-treated with the new compositions of matter will not be as great as when treated in a non-alkaline liquor.

To prepare the after-treating baths, the new compositions of matter may be dissolved in water.

The following examples illustrate the invention, but are not to be regarded as limiting it in any way, the parts being by weight unless otherwise stated:

Example 1

10.9 parts of crystallized copper-II-acetate, 17.4 parts of ammonium chloride, 39.1 parts of anhydrous sodium carbonate and 32.6 parts of a water-soluble condensation product from dicyandiamidine and formaldehyde are mixed together and finely ground.

The condensation product mentioned may be obtained by heating dicyandiamidine with four times its quantity of commercial formaldehyde of 30 per cent. strength for about 10 minutes to 100° C.

Instead of the condensation product from dicyandiamidine and formaldehyde the new compositions of matter may contain condensation products from formaldehyde and guanidine, cyanamide, dicyandiamide, acetoguanidine, melamine, biguanide, etc.

Instead of copper-II-acetate there may be used copper-II-sulfate.

The above described compositions of matter can be used as follows:

Use is made of (a) the dyestuff which dyes cotton yellowish green tints and which is obtained by coupling the diazotized aminoazo-dyestuff from 4-diazo-1-hydroxybenzene-2-carboxylic acid and 1-amino-2-ethoxynaphthalene with the ternary condensation product from 1 mol of cyanuric chloride, 1 mol of 1-amino-8-hydroxynaphthalene-3:6-disulfonic acid and 2 mols of 4-amino-4'-hydroxy-1:1'-azobenzene-3'-carboxylic acid; and (b) The dyestuff which dyes cotton violet brown tints and which is obtained by coupling tetrazotized 4:4' - diamino - 3:3' - dimethoxy-diphenyl with salicylic acid and with the monoazodyestuff from 2-diazo-1-hydroxybenzene-4-sulfonic acid and resorcin, which coupling is followed by after-coppering for 1 hour at 80° C.

100 parts of cotton yarn dyed with 1.25 per cent. of dyestuff (a) above or with 1.2 per cent. of dyestuff (b) above are treated for 30 minutes in a liquor of 20° C. which has been prepared by dissolving 6 parts of one of the above mentioned compositions of matter in 3000 parts of water. The yarn is then centrifuged and dried. In this manner a considerable improvement is obtained of the fastness of the dyeings to washing with soap and sodium carbonate at 60° C.

Example 2

1.68 parts of the formaldehyde-dicyandiamidine condensation product described in Example 1 are mixed with 0.32 part of diethylenediamine-copper-II-acetate or diethylene-diamine-copper-II-sulfate.

This composition of matter may be utilized as follows:

Use is made of the dyestuff which dyes cotton blue-green tints and which is obtained by coupling the diazotized aminoazo-dyestuff from 4-diazo-1-hydroxybenzene-2-carboxylic acid and 1-amino-2-methoxynaphthalene-6-sulfonic acid with the ternary condensation product from 1 mol of cyanuric chloride, 1 mol of 2-amino-5-hydroxynaphthalene-7-sulfonic acid and 2 mols of 4-(4'-aminobenzoyl)-amino - 1 - hydroxybenzene-2-carboxylic acid.

100 parts of cotton yarn dyed with 2.50 per cent. of the above dyestuff are after-treated for 30 minutes in a liquor of 20° C., prepared by dissolving 2 parts of the above described mixture in 3000 parts of water with the addition of 3 parts of sodium carbonate. The yarn is then centrifuged and dried. In this manner a considerable improvement is obtained of the fastness of the dyeings to washing with soap and sodium carbonate at 60° C.

Similar effects are obtained when after-treating dyeings made with the following dyestuffs:

(a) The dyestuff which dyes cotton green tints and which is obtained by coupling the diazotized aminoazo-dyestuff from 1-diazo-8-hydroxynaphthalene-3:6-disulfonic acid and 1-amino-2:5-dimethoxybenzene with the condensation product from 1 mol of cyanuric chloride, 1 mol of 1-amino - 8 - hydroxynaphthalene - 3:6 - disulfonic acid, 1 mol of 4-amino-4'-hydroxy-1:1'-azobenzene-3'-carboxylic acid and 1 mol of ammonia; or (b) The dyestuff which dyes cotton red tints and which is obtained by the condensation of 1 mol of cyanuric chloride with 1 mol of the aminoazo-dyestuff obtained from 1-diazo-8-hydroxynaphthalene-3:6-disulfonic acid and 1-amino-2-methoxy-5-methylbenzene, 1 mol of 4-amino-4'-hydroxy-1:1'-azobenzene-3'-carboxylic acid and 1 mol of aniline.

*Example 3*

1.2 parts of the formaldehyde-dicyandiamidine condensation product described in Example 1 are mixed with 0.8 part of tetrammine-copper-II-sulfamate. This mixture can be used as follows:

Use is made of the dyestuff which dyes cotton scarlet tints and which is obtained by reacting 1 mol of cyanuric chloride with 1 mol of the azo-dyestuff obtained from diazotized 1-amino-8-hydroxynaphthalene-3:6-disulfonic acid and 1-amino-2-methoxy-5-methylbenzene, 1 mol of the azo-dyestuff from diazotized 1-amino-2-methoxy-benzene-4-sulfonic acid and 2-amino-5-hydroxynaphthalene-7-sulfonic acid (coupled in an alkaline medium) and 1 mol of aniline.

In order to enhance the fastness to washing of a 1 per cent. dyeing made with the above dyestuff on cellulose wool yarn, the procedure of Example 1 is followed except that in lieu of the there described after-treatment liquor a bath is used which in 3000 parts of water contains 2 parts of the above mixture, 2 parts of a concentrated aqueous ammonium solution and 3 parts of sodium carbonate.

In similar manner the fastness to washing of the dyestuffs indicated in (b), Example 2, or (b), Example 1, can be increased; also the fastness to washing of the dyestuff which dyes cotton black tints and which is obtained by coupling 4-diazo-1-hydroxybenzene-2-carboxylic acid with 1-aminonaphthalene, further diazotizing the resultant aminoazo-dyestuff and coupling it in an alkaline medium with 2-amino-8-hydroxynaphthalene-6-sulfonic acid.

Instead of the dicyandiamidine condensation product there may be used any other condensation product mentioned in Example 1. The tetrammine-copper-II-sulfamate may likewise be replaced by tetrammine-copper-II-nitrate.

*Example 4*

1.67 parts of the formaldehyde-dicyandiamidine condensation product described in Example 1 and 0.33 part of the complex compound from copper acetate and triethanolamine are mixed with each other.

The above copper complex compound may be prepared as follows:

6 parts of copper acetate

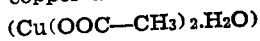

are suspended in 20 parts of water, 4.5 parts of triethanolamine are added and the whole is heated to 80° C. and a small amount of a water-insoluble compound is removed. After distilling off the water under reduced pressure, the oily residue is triturated with acetone whereupon the complex copper compound solidifies. It is a blue, water-soluble powder.

The above mixture may be used as follows for the after-treatment of dyeings:

100 parts of a cellulose wool yarn dyed with 1.5 per cent. of the dyestuff indicated in (b), Example 1, and 1.25 per cent. of the last dyestuff mentioned in Example 3 which dyes cotton black tints are treated as prescribed by Example 1, except that a liquor is used which has been prepared by dissolving 2 parts of the above mixture in 3000 parts of water with the addition of 3 parts of sodium carbonate.

As a result, the fastness of the dyeing to washing with soap and sodium carbonate at 60° C. is considerably enhanced.

What we claim is:

1. A composition of matter which, on addition of water, forms an aqueous solution of a complex copper salt and of a basic condensation product of formaldehyde with a member selected from the group consisting of dicyandiamide, dicyandiamidine, guanidine and biguanide, said composition of matter containing besides the aforementioned condensation product ingredients forming on addition of water a solution of a water-soluble complex copper compound which is soluble in an alkaline aqueous bath, which composition of matter enhances the wet-fastness of an after-treated cellulosic textile colored with a water-soluble substantive dyestuff.

2. A composition of matter which, on addition of water, forms an aqueous solution of a complex copper salt and of a basic condensation product of formaldehyde with dicyandiamidine, said composition of matter containing besides the afore-mentioned condensation product a water-soluble cupric salt, an ammonium salt and an alkali carbonate, which composition of matter enhances the wet-fastness of an after-treated cellulosic textile colored with a water-soluble substantive dyestuff.

3. A composition of matter which, on addition of water, forms an aqueous solution of a complex copper salt and of a basic condensation product of formaldehyde with dicyandiamidine, said composition of matter containing besides the aforementioned condensation product cupric acetate, ammonium chloride and an alkali carbonate, which composition of matter enhances the wet-fastness of an after-treated cellulosic textile colored with a water-soluble substantive dyestuff.

4. A composition of matter which, on addition of water, forms an aqueous solution of a complex copper salt and of a basic condensation product of formaldehyde with a member selected from the group consisting of dicyandiamide, dicyandiamidine, guanidine and biguanide, said composition of matter containing besides the afore-mentioned condensation product a water-soluble complex copper compound which is soluble in an alkaline aqueous bath, which composition of matter enhances the wet-fastness of an after-treated cellulosic textile colored with a water-soluble substantive dyestuff.

5. A composition of matter which, on addition of water, forms an aqueous solution of a complex copper salt and of a basic condensation product of formaldehyde with a member selected from the group consisting of dicyandiamide, dicyandiamidine, guanidine and biguanide, said composition of matter containing besides the afore-mentioned condensation product a water-soluble tetrammine cupric salt, which composition of matter enhances the wet-fastness of an after-treated cellulosic textile colored with a water-soluble substantive dyestuff.

6. A composition of matter which, on addition of water, forms an aqueous solution of a complex copper salt and of a basic condensation product of formaldehyde with dicyandiamidine, said composition of matter containing besides the afore-mentioned condensation product a water-soluble tetrammine cupric salt, which composition of matter enhances the wet-fastness of an after-treated cellulosic textile colored with a water-soluble substantive dyestuff.

7. A composition of matter which, on addition of water, forms an aqueous solution of a complex copper salt and of a basic condensation product of formaldehyde with dicyandiamidine, said composition of matter containing besides the afore-mentioned condensation product tetrammine cupric sulfamate, which composition of matter enhances the wet-fastness of an after-treated cellulosic textile colored with a water-soluble substantive dyestuff.

8. A composition of matter which, on addition of water, forms an aqueous solution of a complex copper salt and of a basic condensation product of formaldehyde with dicyandiamidine, said composition of matter containing besides the afore-mentioned condensation product a water-soluble complex diethylenediamine cupric salt, which composition of matter enhances the wet-fastness of an after-treated cellulosic textile colored with a water-soluble substantive dyestuff.

9. A composition of matter which, on addition of water, forms an aqueous solution of a complex copper salt and of a basic condensation product of formaldehyde with dicyandiamidine, said composition of matter containing besides the afore-mentioned condensation product di-ethylenediamine cupric acetate, which composition of matter enhances the wet-fastness of an after-treated cellulosic textile colored with a water-soluble substantive dyestuff.

OTTO ALBRECHT.
JOST FREI.
ALBERT LANDOLT.

REFERENCES CITED

The following references are of record in the file of this patent:

UNITED STATES PATENTS

| Number | Name | Date |
|---|---|---|
| 1,690,782 | Hentrich | Nov. 6, 1928 |
| 1,853,418 | Hentrich | Apr. 12, 1932 |
| 2,148,659 | Straub | Feb. 28, 1939 |
| 2,253,457 | Whittaker | Aug. 19, 1941 |
| 2,364,726 | Landolt | Dec. 12, 1944 |